United States Patent [19]

Dworsky et al.

[11] Patent Number: 5,051,643

[45] Date of Patent: Sep. 24, 1991

[54] ELECTROSTATICALLY SWITCHED INTEGRATED RELAY AND CAPACITOR

[75] Inventors: Lawrence Dworsky, Northbrook; Marc K. Chason, Schaumburg, both of Ill.

[73] Assignee: Motorola, Inc., Schaumburg, Ill.

[21] Appl. No.: 575,092

[22] Filed: Aug. 30, 1990

[51] Int. Cl.$^5$ ........ H02N 1/00

[52] U.S. Cl. ........ 310/309; 200/181

[58] Field of Search ........ 310/309; 200/181

[56] References Cited

U.S. PATENT DOCUMENTS

| | | | |
|---|---|---|---|
| 2,927,255 | 3/1960 | Diesel | 200/181 |
| 3,292,111 | 12/1966 | Cotton | 200/181 |
| 3,295,023 | 12/1966 | Peras | 200/181 |
| 3,769,531 | 10/1973 | Elkuch | 310/309 |
| 4,480,162 | 10/1984 | Greenwood | 200/181 |
| 4,789,803 | 12/1988 | Jacobsen et al. | 310/309 |
| 4,959,515 | 9/1990 | Zavracky et al. | 200/181 |

FOREIGN PATENT DOCUMENTS

| | | | |
|---|---|---|---|
| 0452877 | 12/1974 | U.S.S.R. | 200/181 |
| 0653637 | 3/1979 | U.S.S.R. | 200/181 |
| 0653642 | 3/1979 | U.S.S.R. | 200/181 |
| 0601771 | 4/1987 | U.S.S.R. | 200/181 |

*Primary Examiner*—Mark O. Budd
*Assistant Examiner*—Thomas M. Dougherty
*Attorney, Agent, or Firm*—Steven G. Parmelee; Joseph P. Krause; Jack W. Hayes

[57] ABSTRACT

An electrostatically energized and integrable relay is disclosed that has dimensions that permit closure and maintenance of a contact between electrodes using electrostatic forces exclusively. The physical dimensions are such that it could be formed using integrated circuit fabrication techniques. Small spacing between the electrodes of the relay permit the device to be usable in an integrated form, perhaps on an integrated circuit substrate.

25 Claims, 3 Drawing Sheets

FIG. 1
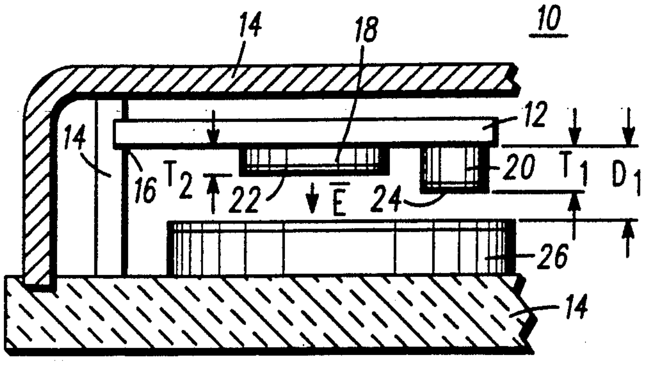
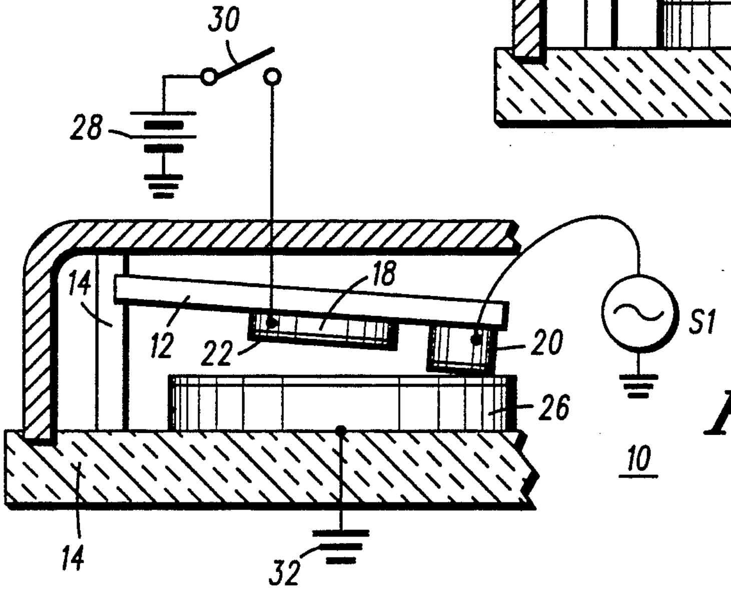
FIG. 2
FIG. 3
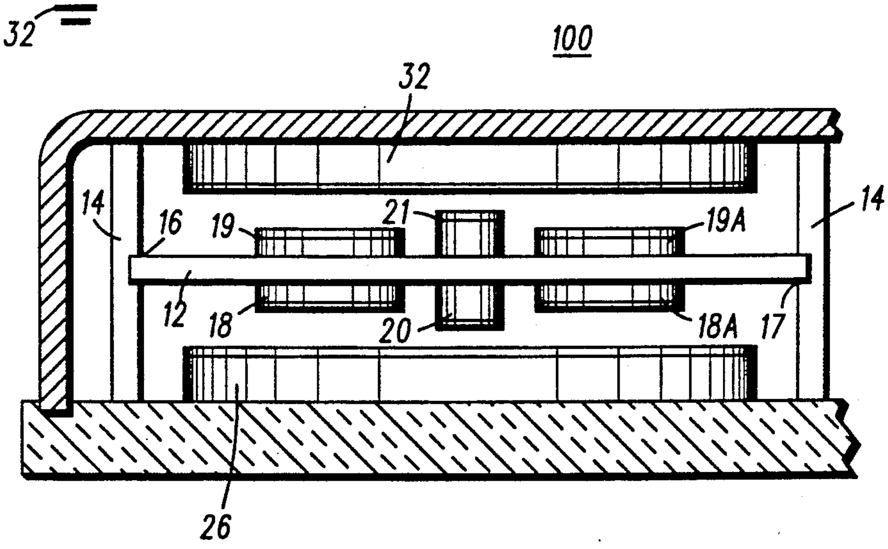
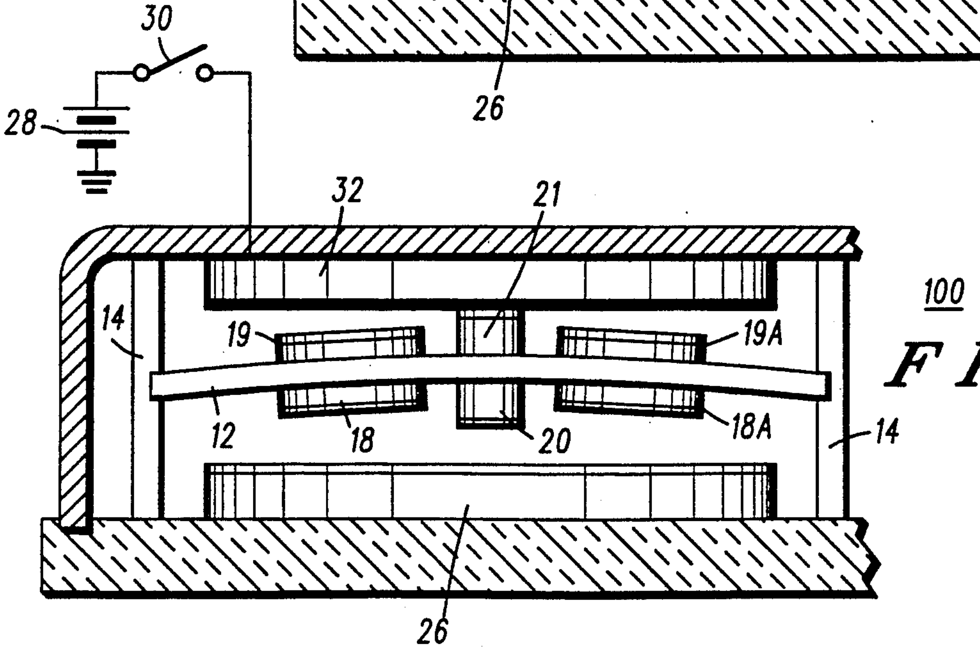
FIG. 4

ELECTROSTATICALLY SWITCHED INTEGRATED RELAY AND CAPACITOR

BACKGROUND OF THE INVENTION

This invention relates to relays. In particular, this invention relates to small, electrostatically operated relays that may be formed using integrated circuit fabrication techniques.

In its simplest form, an electrical relay is a pair of contacts that are brought together by an electrically driven actuator. The most common example of an electrical relay is the electromagnetic solenoid driven relay. In this pedestrian type of device, an electromagnetic solenoid is energized by an external power source creating a magnetic field that causes a movable armature to move, closing contacts on the armature and the fixed stator.

Most prior art electromagnetic relays are physically large, consume large amounts of power, and are difficult to manufacture in an integrated manner. They are impractical for low cost, physically small, and energy efficient applications.

It is well known that at close separation distances, electrostatic forces may be used to effectuate closure of the relay contacts. It would be an improvement over prior art electromagnetic relays to have a very small relay with contact separation distances close enough to permit electrostatic closure of the armature and the stator.

Previous attempts at this type of device have concentrated on using piezoelectric actuators to move the electrodes. These structures never worked well, primarily because the moving contact was always very sensitive to vibration and shock. Furthermore, small, effective piezoelectric actuators are difficult to manufacture. A small, integrable, electrostaticically driven relay would be an improvement over the prior art. Such a structure might be used to switch small signals and may be used to fabricate a switched capacitor.

SUMMARY OF THE INVENTION

There is provided herein an electrostatically operated relay having an armature and a stator, the contacts of which are closed by electrostatic forces existing between the armature and the stator. In at least one embodiment, electrostatic forces are set up between electrical contacts mounted on a deflectable beam that comprises the stator, and contacts on a fixed contact corresponding to a relay stator.

The deflectable beam is fixed to a substrate. The deflectable beam may be formed by any appropriate process including integrated circuit techniques wherein sacrificial materials might be deposited into a region. A beam can be formed over the sacrifical material using vapor deposition techniques for example. After formation of the beam, the sacrificial material can be removed, leaving the beam in place.

The stator may be formed using a portion of the substrate positioned adjacent to the deflectable beam means and carrying an electric charge such that a signal on an electrode on the deflectable beam means creates an electrostatic force between the contact on the beam means and the electrode that causes the deflectable beam means to deflect effectuating a contact closure between the electrode on the deflectable beam and the substrate.

Using integrated circuit techniques, very small electrostatically energized relays are possible. By adding a dielectric layer between switched contacts of the embodiment a switched capacitor may be fabricated.

BRIEF DESCRIPTION OF THE DRAWINGS

FIG. 1 shows a representative diagram of a preferred embodiment of the invention.

FIG. 2 shows the electrostatic relay of FIG. 1 in an energized position with a signal electrode coupled to a fixed electrode.

FIG. 3 shows an alternate embodiment of an electrostatically energized relay having two fixes electrodes and being operable in two directions.

FIG. 4 shows the electrostatic relay of FIG. 3 being energized to effectuate a switched closure of the beam in an upward direction.

DETAILED DESCRIPTION OF THE PREFERRED EMBODIMENT

Figure 5:
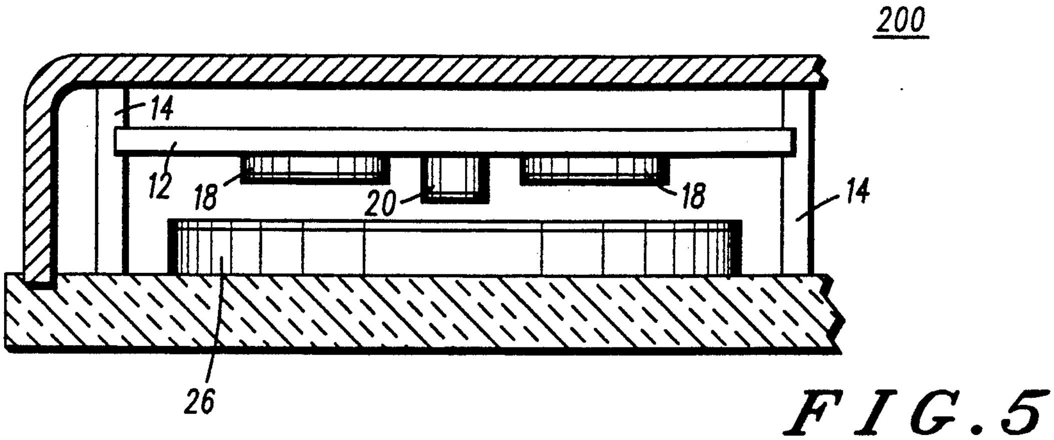
FIG. 5 shows another embodiment of an electrostatic relay having a driving electrode circling a signal electrode.

FIG. 1 shows a representative crossectional diagram of an electrostatically energized relay (10). The relay (10) includes a deflectable cantilevered beam (12) to which is attached an electrostatic driving electrode (18) and a signal electrode (20). Both of these electrodes (18 and 20) have contact surfaces (22 and 24 respectively) and predetermined thickness $T_2$ and $T_1$ as shown that establish a separation distance from a fixed electrode (26).

The deflectable beam (12), which is a cantilevered beam, is supported at one end (16) by being affixed to a substrate (14). The substrate is substantially rigid with respect to the cantilever beam (12).

The cantilevered beam (12) may be fabricated using any appropriate technique, including micromachining, vapor deposition, or other appropriate integrated circuit technology. Its composition is such that it has a rigidity enabling it to maintain the spacing between the electrodes (18) and (20) and a fixed electrode (26) in the absence of an electric field.

A fixed electrode (26) is separated from the cantilevered beam by a distance $D_1$ as shown. The distance $D_1$ and the thicknesses $T_1$ and $T_2$ are controlled such that application of a predetermined electric field, E, between the driving electrode (18) and the fixed electrode (26) by means of external power sources (not shown) is of a sufficient field strength to cause the cantilevered beam to deflect in a direction that corresponds to the orientation of the electric field E. An electric field between the driving electrode (18) and the fixed electrode

(26) might be caused by a voltage source coupled to the driving electrode (18) and holding the fixed electrode (26) at a reference potential. If the electrostatic field between the driving electrode (18) and the fixed electrode (26) is sufficiently strong, the cantilevered beam will deflect causing a closure of the contact surface (24) of the signal electrode (20) to the contact surface of the fixed electrode (26). The electrostatic force can be maintained as long as an E field is maintained between the driving electrode (18) and the fixed electrode (26). Since the thickness $T_2$ of the driving electrode (18) is less than the thickness $T_1$ of the signal electrode (20), the electrostatic driving electrode can maintain an electric field, E, as shown even while the signal electrode (20) is electrically in contact with the fixed electrode (26).

Note that if the electrostatic driving electrode (18) were equally as thick as the signal electrode, (if $T_2$ were equal to $T_1$) upon application of electric field between the driving electrode (18) and the fixed electrode (26), the cantilevered beam (12) would deflect causing the electrostatic driving electrode (18) to contact the fixed electrode creating a short circuit. Upon the closure of the driving electrode (18) to the fixed electrode (26) the electric field and the force exerted upon the cantilevered beam by it would vanish permitting the cantilevered beam to relax or deflect upwards opening the contact existing between the signal electrode (20) and the fixed electrode (26). Reducing the thickness $T_2$ of the driving electrode (18) permits the driving electrode (18) to maintain the electric field E between the fixed electrode and the driving electrode in effect keeping the contact closed while the electric field exists between the electrode (18) and the fixed electrode (26).

FIG. 2 shows the relay of FIG. 1 but in an energized position. This figure also shows application of a signal S1 to the signal electrode (20) that may be any relevant signal source. An electrostatic driving force (28) may be coupled to the electrostatic driving electrode (18) by closure of a switch (30) as shown.

It should be mentioned that the thickness $T_2$ of the electrode (18) is such that the distance between the contact surface (22) and the fixed electrode (26) is small enough to permit development of an electrostatic force large enough to cause the deflectable beam to move. In the preferred embodiment, the separation distance, D1, was less than 25 microns.

FIG. 3 shows an alternate embodiment of the electrostatically energized relay. In this figure, a relay (100) is shown with two fixed electrodes (26 and 32) both above and below a deflectable beam (12). In this diagram, four electrostatic driving contacts are shown (18, 18*a*, and 19*a*). The substrate (14) holds the deflectable beam (12) at two ends (16 and 17) as shown. Upon application of an electric field to either the upper electrodes 19 and 19*a*, or the lower electrodes 18 and 18*a*, the deflectable beam (12) may deflect in either direction.

FIG. 4 shows the electrostatic relay of FIG. 3 in an energized position caused by the application of biased voltage (28) through a switch (30) to the upper fixed electrode (32). In this drawing, the driving electrodes (19 and 19*a*) would of course be at a voltage potential other than that of the bias source (28) to cause the deflectable beam means to deflect in the direction as shown. Those skilled in the art will recognize that the direction of the deflection of the beam (12) may be controlled by the placement of the bias source (28) to either of the fixed electrodes (32 and 26).

Figure 5A:
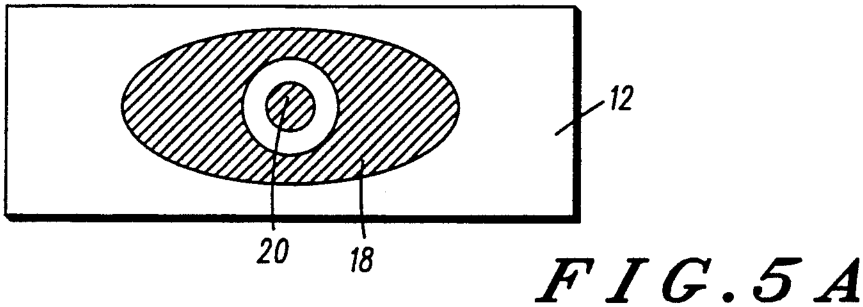
FIG. 5*a* shows an alternate embodiment of the geometry of the signal and driving electrodes.

FIG. 5 shows yet another embodiment of the relay (200). In this drawing, the relay of FIGS. 3 and 4 is shown but with one fixed electrode (26). FIG. 5*a* also shows an alternate embodiment of the geometry of the signal and driving electrodes (18 and 20). In FIG. 5*a* the deflectable beam (12) resembles a plate upon which there is an electrical conductive surface (18). A portion of the electrically conducting surface is etched to leave the center signal electrode (20) intact as shown.

Figure 6:
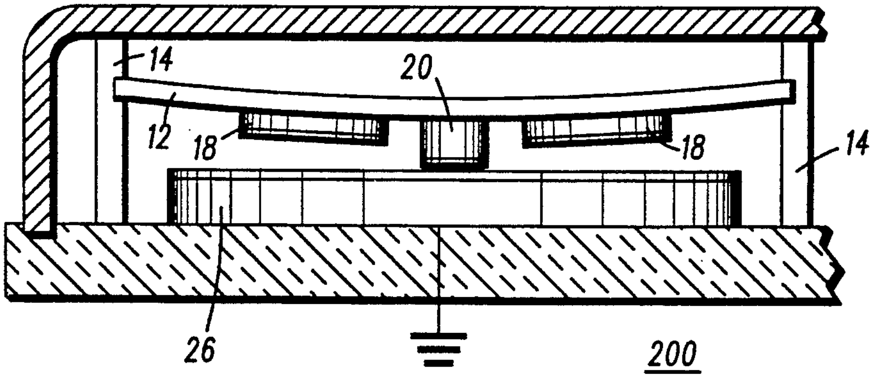
FIG. 6 shows the electrostatic relay of FIG. 5 in an energized position.

FIG. 6 shows the electrostatic relay (200) of FIG. 5 in an energized position. The operation of this relay is similar to that described above in that the thickness of the driving electrodes (18) being less than the thickness of the signal electrode (20) permits an electrostatic field to exist between the driving electrode (18) and the fixed electrode (26) despite the signal electrodes electrically continuity with the fixed electrode.

Figure 7:
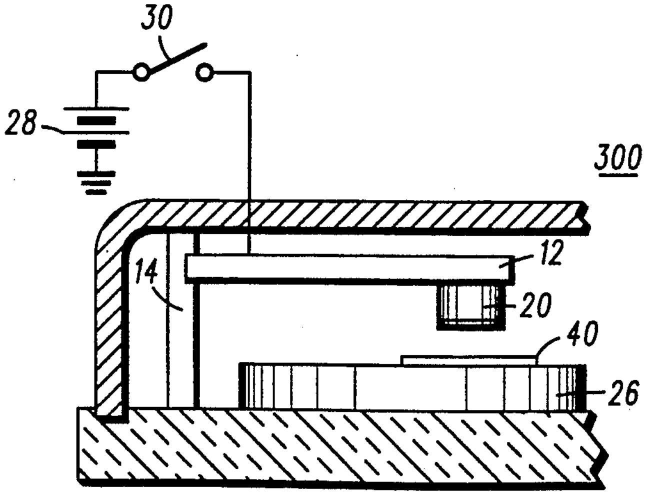
FIG. 7 shows a crossectional represented view of a switched capacitor. The device shown in FIG. 7 resembles that shown in FIG. 1 but with the inclusion of a dielectric.

FIG. 7 shows a switched capacitor (300) that closely resembles the electrostatically switched relay of FIG. 1. In this figure, a dielectric layer (40) has been added to the fixed electrode (26) to lie between the signal electrode (20) and the fixed electrode (26). Upon the application of an electric field by coupling a voltage source (28) to the electrode (20) through a switch (30) an electric field is established between the signal electrode (20) that passes through the dielectric layer (40), in turn causing the cantilevered beam (12) to deflect with respect to the substrate (14) as shown in FIG. 8.

Figure 8:
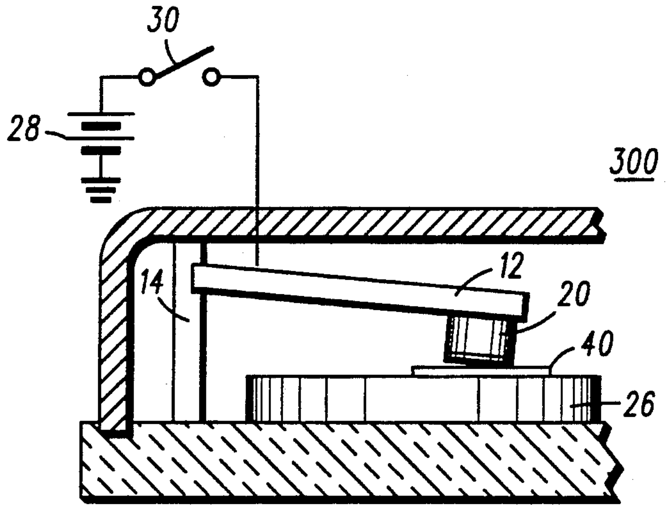
FIG. 8 shows the switched capacitor in an energized position.

In FIG. 8, the switched capacitor of FIG. 7 is shown in an energized position. Note that in this figure the fixed electrode (26) is part of the substrate (14) that suspends or supports the cantilevered beam (12). In this position, a capacitor is formed between the driving or signal electrode (20) and the fixed electrode (26).

Figure 9:
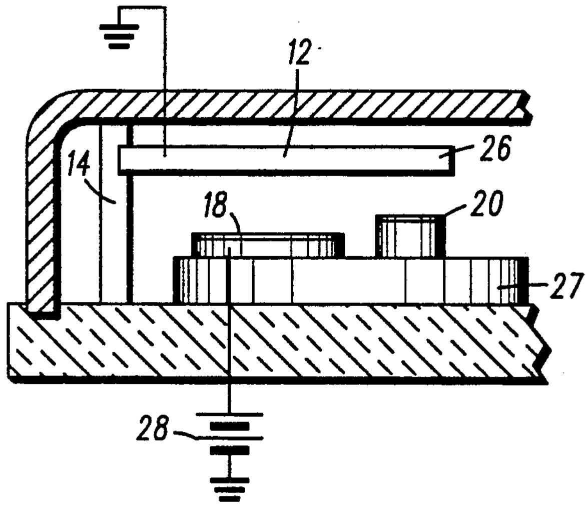
FIG. 9 shows an embodiment of the invention depicted in FIG. 1 with the placement of the electrodes reversed.

FIG. 9 shows an electrostatically switched capacitor formed from a structure similar to that shown in FIG. 1. In FIG. 9, a dielectric layer has been added to the structure of FIG. 1, between the signal electrode (20) and the fixed electrode (26) whereby an electrostatic force existing between the driving electrode 18 and fixed electrode (26) deflects the cantilevered beam (12) to increase the capacitance between the signal electrode (20) and the fixed electrode (26). (The dielectric layer (40) might be coupled to either the cantilevered beam (12) or the fixed electrode (26).)

In the embodiments shown above, the spacing between the fixed electrode and the contact surfaces of the driving and signal electrodes is small, typically less than 10 microns. At these distances the magnitude of the voltage that may be carried between the contacts without arcing may be small but yet a practical integratable switched relay or switched capacitor can be realized that is useful for many applications.

The deflectable beam may be fabricated using integrated circuit techniques by depositing a sacrificial layer to form the space between the cantilevered beam and the fixed electrode. A conductor or semiconductor or other partially conductive material may be deposited onto this sacrificial layer forming the cantilevered beam or the deflectable beam followed by the subsequent removal of the sacrificial layer by chemical etching or micromachining techniques leaving the deflectable beam in place.

Referring to FIG. 1, those skilled in the art will recognize that a functionally equivalent embodiment of the invention could be realized by energizing the cantilevered beam at some reference potential and mounting the driving electrode (18) and the signal electrode (20) on the layer shown as the fixed electrode (26).

Figure 10:
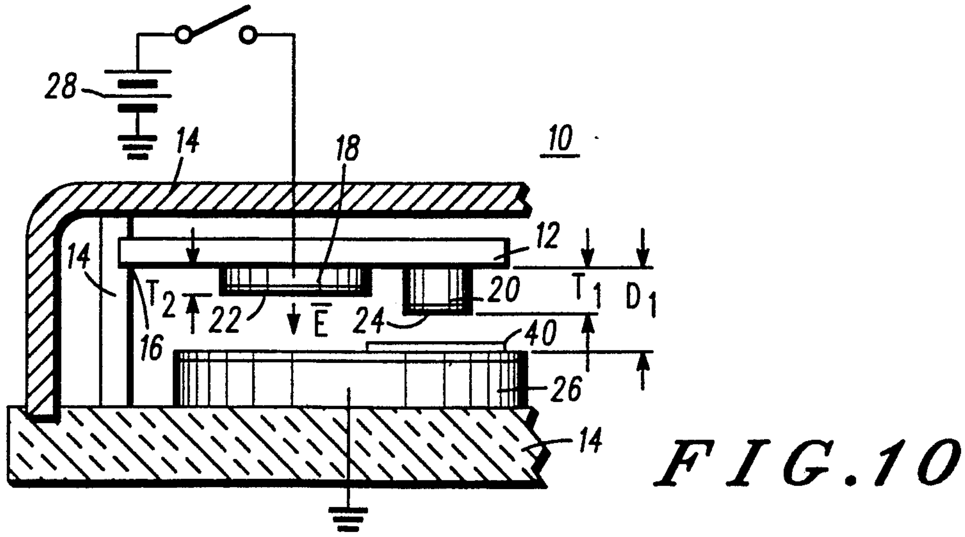
FIG. 10 shows an alternate embodiment of a switched capacitor.

FIG. 10 shows yet another embodiment of an electrically switched relay. In this figure the driving electrode (18) and the signal electrode (20) are on the cantilevered beam. The cantilevered beam (12) is maintained at a potential as shown and takes on the function of the fixed electrode shown in FIGS. 1 through 8. Upon the application of a voltage (28) to the driving electrode (18) the cantilevered beam (12) will deflect such that the signal electrode (20) will be physically contacting the dielectric (40) and not contacting the substrate (26). (The direction of the deflection of the cantilevered beam (12) is downward in FIG. 10 however alternate embodiments would contemplate deflection in the other direction if the electrodes (18 and 20) were on the upper surface of the beam (12) and if the fixed electrode (26) were located above the cantilevered beam (12).)

It should be realized that each of the embodiments shown in the figures may be altered to reverse the mounting position or locations of the electrostatic driving electrode (18) and the signal electrode (20) from being coupled to the cantilevered beam (12) to being located on the fixed electrode (26) or substrate (27) as shown in FIG. 1. Similarly, referring to FIGS. 7 and 8, the dielectric layer may be mounted on the deflectable beam means (12) rather than on the substrate (26).

What is claimed is:

1. An electrostatically operated relay having an armature and stator and contacts that are closed by electrostatic forces existing between the armature and the contacts comprised of:

deflectable beam means, having at least first and second sides, fixed to a substrate at at least one point, for supporting at least first and second electrodes coupled to said first side of deflectable beam means, both said first and second electrodes having contact surfaces and having first and second thickness respectively, said first thickness being greater than said second thickness, said first and second electrodes respectively carrying first and second electrical signals, said deflectable beam means having a first non-deflected position and at least a second deflected position; and third electrode means, fixed to said substrate, for establishing an electric field between said third electrode and said second electrode and for electrically coupling signals from said first electrode to said third electrode, said third electrode being separated from said contact surfaces by a first separation distance when said deflectable beam means is in said first non-deflected position, said third electrode being at an electric reference potential for signals carried on said first and second electrodes such that an electric field established between said second electrode and said third electrode causes said deflectable beam means to deflect to said second deflected position whereat an electrical coupling is established between said first and third electrodes.

2. The relay of claim 1 where said deflectable beam means is a cantilevered beam.

3. The relay of claim 1 where said deflectable beam means is a supported beam fixed at two opposite ends such that a center portion of said supported beam translates with deflection of said supported beam.

4. The relay of claim 1 where said substrate is at least partially conductive material.

5. The relay of claim 4 where said third electrode is formed with said substrate.

6. The relay of claim 1 where said third electrode is formed by a material deposition technique.

7. The relay of claim 1 where said beam and said electrodes are integrated onto a substrate.

8. The relay of claim 1 where said first separation distance is less than 25 microns.

9. The relay of claim 1 where said electric reference potential is ground potential.

10. The relay of claim 1 where said signal on said second electrode is a D.C. signal.

11. The relay of claim 1 including a dielectric layer between said first and third electrode means.

12. An electrostatically operated relay having an armature and stator and contacts that are closed by electrostatic forces existing between the armature and at least one of the contacts, said relay comprised of:

deflectable beam means, fixed to a substrate at at least one point for conducting electrical signals and for deflecting in response to electrostatic forces exerted upon it, said deflectable beam means having a first non-deflected position and at least a second deflected position; and first and second substantially stationary, substantially planar, electrodes, fixed to said substrate, said first and second electrodes each having contact surfaces and having first and second thickness respectively, said first thickness being greater than said second thickness, said first and second electrodes respectively carrying first and second electrical signals for establishing an electric field between said deflectable beam means and said second electrode, said deflectable beam means being separated from said contact surfaces by a first separation distance when said deflectable beam means is in said first non-deflected position such that an electric field established between said second electrode and said deflectable beam means causes said deflectable beam means to deflect to said second deflected position whereat an electrical coupling is established between said first electrode and said deflectable beam means.

13. The relay of claim 12 where said deflectable beam means is a cantilevered beam.

14. The relay of claim 12 where said deflectable beam means is a supported beam fixed at two opposite ends such that a center portion of said supported beam translates with deflection of said supported beam.

15. The relay of claim 12 where said substrate is at least partially conductive material.

16. The relay of claim 12 where said first and second electrodes are formed with said substrate.

17. The relay of claim 12 where said third electrode is formed by a material deposition technique.

18. The relay of claim 12 where said beam and said electrodes are integrated onto a substrate.

19. The relay of claim 12 where said first separation distance is less than 25 microns.

20. The relay of claim 12 where said electric reference potential is ground potential.

21. The relay of claim 12 where said signal on said second electrode is a D.C. signal.

22. The relay of claim 12 where said first and second substantially planar electrodes are concentric circles.

23. An electrostatically operated relay having an armature and stator and contacts that are closed by electrostatic forces existing between the armature and the contacts comprised of:

a supported beam, fixed to a substrate at two opposite ends such that a center portion of said supported beam translates with deflection of said supported beam, for supporting at least a first electrode coupled to said supported beam, said first electrode having a contact surface, said first electrode respectively carrying a first electrical signal, said supported beam having a first non-deflected position and at least a second deflected position; and second electrode means, fixed to said substrate, for establishing an electric field between said second electrode and said first electrode and for electrically coupling signals from said first electrode to said second electrode, said second electrode being separated from said contact surface by a first separation distance when said supported beam is in said first non-deflected position, said second electrode being at an electric reference potential for signals carried on said first electrode such that an electric field established between said first and second electrode causes said supported beam to deflect to said second deflected position whereat an electrical coupling is established between said first and second electrodes; and a dielectric layer coupled to at least one of said first and second electrodes, said dielectric layer and said first and second electrodes forming a capacitor having increased capacitance when said deflectable beam means is in said second position.

24. An electrostatically operated relay having an armature and stator and contacts that are closed by electrostatic forces existing between the armature and the contacts comprised of:

deflectable beam means, fixed to an at least partially conductive substrate at at least one point, for supporting at least a first electrode coupled to said deflectable beam means, said first electrode having a contact surface, said first electrode respectively carrying a first electrical signal, said deflectable beam means having a first non-deflected position and at least a second deflected position; and second electrode means, fixed to said substrate, for establishing an electric field between said second electrode and said first electrode and for electrically coupling signals from said first electrode to said second electrode, said second electrode being separated from said contact surface by a first separation distance when said deflectable beam means is in said first non-deflected position, said second electrode being at an electric reference potential for signals carried on said first electrode such that an electric field established between said first and second electrode causes said deflectable beam means to deflect to said second deflected position whereat an electrical coupling is established between said first and second electrodes; and a dielectric layer coupled to at least one of said first and second electrodes, said dielectric layer and said first and second electrodes forming a capacitor having increased capacitance when said deflectable beam means is in said second position.

25. An electrostatically operated relay having an armature and stator and contacts that are closed by electrostatic forces existing between the armature and the contacts comprised of:

deflectable beam means, fixed to a substrate at at least one point, for supporting at least a first electrode coupled to said deflectable beam means, said first electrode having a contact surface, said first electrode respectively carrying a first electrical signal, said deflectable beam means having a first non-deflected position and at least a second deflected position; and second electrode means, fixed to said substrate, for establishing an electric field between said second electrode and said first electrode and for electrically coupling signals from said first electrode to said second electrode, said second electrode being separated from said contact surface by a distance less than 25 microns when said deflectable beam means is in said first non-deflected position, said second electrode being at an electric reference potential for signals carried on said first electrode such that an electric field established between said first and second electrode causes said deflectable beam means to deflect to said second deflected position whereat an electrical coupling is established between said first and second electrodes; and a dielectric layer coupled to at least one of said first and second electrodes, said dielectric layer and said first and second electrodes forming a capacitor having increased capacitance when said deflectable beam means is in said second position.

* * * * *